United States Patent Office 3,100,844

Patented Aug. 13, 1963

1

3,100,844
FLUID FLOW INDICATING PROCESS

Marcel J. Vogel, San Jose, Calif., assignor to International Business Machines Corporation, New York, N.Y., a corporation of New York No Drawing. Filed Dec. 23, 1960, Ser. No. 77,832
5 Claims. (Cl. 250—71)

My invention relates to a process for determining fluid flow and, more particularly, to a process for determination of fluid flow through utilization of triboluminescent phosphors. New and better types of fluid flow indicators are constantly being sought. Thus, manufacturers of random access type computers utilizing air heads to write on and retrieve information from magnetic recording media can design better vent patterns with better information relative to air flow from the vents. Makers of spray equipment need fluid flow information to design nozzles of various types. Manufacturers of chemicals, food manufacturers, and makers of rocket motors all require information relative to the extent of mixing taking place when two or more fluid streams are impinged on one another. Makers of spray equipment also need to know, with precision, the exact configuration of spray patterns formed at various distances by different nozzle shapes under differing conditions of fluid viscosity and pressure. Alternately, the aircraft industry needs better information relative to air flow over air foils. Information relative to fluid flow around mixing paddles is of considerable importance to manufacturers of mixing equipment.

I have now discovered that triboluminescent phosphors can be utilized to obtain information relative to fluid flow under varying conditions of fluid viscosity and flow rate. Thus, my invention can be of use to all of the industries delineated above.

Essentially, my process for obtaining information about fluid flow over a surface comprises suspending in a light-transmitting fluid, triboluminescent phosphor particles, changing the position of the phosphor particles and the surface relative to one another, and causing the phosphor particles to impinge on the surface and emit light as a result of such impingement.

The fluids in which the triboluminescent phosphor particles are suspended are any light-transmitting fluids; that is, any transparent or translucent fluid. The fluid may be a liquid, a slurry, or a dry comminuted solid. The light emitted by the triboluminescent phosphors suspended in the fluid can be recorded visually, photographically, or by other means such as by photoelectric procedures.

The method of incorporating phosphor particles in the fluid stream can be any of the commonly utilized procedures of suspending a solid in a fluid. Thus, an aerosol can be prepared by the usual means and packed in a pressure container. The phosphor can be suspended in a gaseous stream by the methods utilized in suspending particles in an air stream in sandblasting equipment. Alternately, where the fluid is a comminuted solid, a slurry of solid particles in a liquid, or a liquid per se, the phosphor can be stirred into the working fluid.

Any triboluminescent phosphor can be utilized in my process. Such phosphors are well known to the art. Phosphor crystal size is preferably established by elemental content, cooling rate, etc., rather than by grinding; as grinding substantially destroys the triboluminescent properties of the crystals. An example of such a phosphor is a zinc sulfide manganese chloride (ZnSMnCl) phosphor. This preferred phosphor can be prepared from 50 gm. of zinc sulfide, 1 gm. of potassium chloride and 0.18 gm. of manganese chloride ($MnCl_2.4H_2O$). The manganese chloride is blended with the potassium chloride, and the blend mixed thoroughly with the zinc sulfide phosphor. The resulting mixture is fired for 45 minutes at 1,000° C. and cooled rapidly in the air. Firing the phosphor for about 45 minutes at a temperature of about 1,000° C. forms mixed crystals of cubic and hexagonal form which have a pink fluorescence under long wave ultra-violet light. Firing at 1,200° C. produces essentially hexagonal form crystals.

2

Other phosphors which may be used in the place of the described phosphor just given are:

(*a*) ZnS(Mn)
(*b*) ZnCdS(Mn)
(*c*) ZnS(Cu—Mn)
(*d*) ZnCdS(Cu—Mn)
(*e*) ZnS(Pb—Mn)
(*f*) ZnCdS(Pb—Mn)
(*g*) Cas.Eu.ZnO.Li
(*h*) CaS.Pr.ZnO.Li
(*i*) Cas.Sm.ZnO.Li

The ZnCdS—Cu—Mn phosphor, heretofore described as one of the most satisfactory triboluminescent phosphors, is sold under the name L–302–A–1 by U.S. Radium Corporation. X-ray analysis of a sample indicated a composition of 63.5% ZnS, 36% CdS and ½%

$$Mn(NO_3)_2.6H_2O$$

Copper was indicated by emission spectrograph to be less than 0.1%, and there was a trace of silicon. The product had an average particle size of 31.0 microns and a porosity of .500. Crystal study indicated that the zinc sulfide was mostly of the alpha form wtih some of the beta form. The phosphors were either mixed crystals or a crystalline solid solution between zinc sulfide and cadmium sulfide.

Another phosphor sample sold under the name USRC 3630 by U.S. Radium Corporation, on X-ray analysis, indicated 98.80% zinc sulfide and 1.1% manganese nitrate. This product, on emission spectrograph analysis, showed less than .1% copper and a trace of silicon. On wet chemical analysis, 0.1% zinc oxide was found. The average particle size was 11.50 microns and the porosity .500. The crystal structure indicated a small amount of beta zinc sulfide, cubic, and a large amount of alpha zinc sulfide, hexagonal.

While I have described several phosphors above, the preferred phosphor depends on the intended use. Thus, a ZnS phosphor will be preferred to a ZnO phosphor for use in an acetic acid flow determination. If the fluid is highly reactive with the phosphor, the phosphor can be encapsulated in a flexible transparent or translucent film. A phosphor having a short decay time, i.e., about .001 second, will be desired for many fluid flow determinations whereas a phosphor which glows for a longer period, i.e., about .1 second, will be required for other determinations.

The size of the phosphor crystal utilized will also depend on the desired use. Thus, the vents and computer air heads are quite small, while rocket motor nozzles may be considerably larger. Smaller crystals are preferred in gas flow and low viscosity liquid flow characterizations, as they more truly follow the fluid flow, whereas particle size makes little difference in high viscosity liquid, thick, slurry or comminuted solid flow characterizations.

The fluid flow rate and phosphor crystal mass must combine to cause light emission when the phosphor strikes a desired surface. I am not aware that phosphor crystals ever disintegrate so rapidly on high speed impact as to preclude light emission, but if such occurs, it is obvious that I do not intend to include such conditions within the scope of my invention. Similarly, my process is not intended to be utilized in slurries and dry comminuted solid flow streams where the grinding action of the particles causes the phosphor particles to emit sufficient amounts of light to mask the light emitted by particles impinging on the surface over which the fluid flow is being checked.

The following examples more fully illustrate my invention, but it is not intended that my invention be limited to the exact procedures, phosphors or fluids set out. Rather, it is intended that all equivalents obvious to those skilled in the art be included within the scope of my invention as claimed.

*Example I*

A zinc sulfide manganese chlorine phosphor was prepared by blending manganese chloride and potassium chloride and mixing the blend thoroughly with zinc sulfide phosphor. The resulting mixture was placed in a Vycor crucible, the cover attached, and fired for 45 minutes at 1,000° C. in air. The phosphor and crucible were cooled rapidly in the air.

*Example II*

A ZnO.Sm.Li phosphor was prepared by mixing:

| | Gms. |
|---|---|
| ZnO | 80 |
| $SmCl_3$ | 0.5 |
| $Li_2CO_3$ | 5.0 |
| Starch | 5.0 |

and firing at 1,000° C. for one half hour in air. The phosphor showed an orange red triboluminescence. Substitute Eu for samarium to obtain red triboluminescence and didymium to obtain yellow triboluminescence.

*Example III*

To pass air flow over a model wing section, a Pasche spray gun, Model V (Pasche Air Brush Co., Chicago, Illinois), having a 1.5 mm. orifice was loaded with phosphor particles of about 20 microns diameter and sprayed, at 60 lbs. pressure, against the leading edge of the wing section from a point in line with and anterior to the leading edge of the wing; i.e., as though the wing section were in a wind tunnel. The light pattern formed by the particles hitting the air foil and ricocheting and hitting other phosphor particles extended more than an inch from the wing surface and gave information as to the air flow over the wing.

*Example IV*

To determine air flow from an air head vent, phosphor particles are suspended in an aerosol and blown through the vent. Instead of riding over a magnetic record, the head is allowed to ride over a glass pane. The light emission pattern resulting from the phosphor crystal striking the glass is photographed and studied from the opposite side of the glass pane.

*Example V*

Paint spray gun nozzles are evaluated by substituting phosphor particles for usual pigments in a paint formulation and spraying the paint on a transparent glass surface. Photographs are taken of the emitted light pattern from several angles and studied to determine spray patterns.

*Example VI*

The process of Example V is carried out utilizing a phosphor having a short decay period, with the exception that no paint vehicle is utilized. Stroboscopic pictures are taken as the nozzle is moved and air pressure varied to get a more complete evaluation of the various flow patterns resulting from the described manipulation.

*Example VII*

To test the effectiveness of mixing nozzles in a chemical reactor, for example, a bi-inlet reactor for the preparation of ammonium nitrate, polyethylene coated phosphor particles are suspended in the liquid ammonia and aqueous nitric acid feed and sprayed into a glass reactor such as that shown in United States Patent 2,568,901, issued to L. A. Stengel. The phosphor particles in the instream vividly disclose mixing caused by the impinging inlet streams and channeling and other flow defects in the glass bead reactor packing.

*Example VIII*

Air flow, in an air conditioning system, can be determined by placing glass or Plexiglas sections at corners and at curves in air conditioning duct work, entraining triboluminescent particles in the air stream and viewing the light emitted in these sections by triboluminescent phosphor particles striking the walls of the ducts.

*Example IX*

To test the effectiveness of a paddle mixer, triboluminescent particles are suspended in a fluid and the fluid is stirred by the mixer. Fluid flow around the mixer blades is vividly shown by phosphor particles having long decay periods.

Now, having described my invention, what I claim is:

1. A process for obtaining information about the flow of fluid in contact with the surface of a body, comprising suspending in a light-transmitting fluid, triboluminescent phosphor particles, causing relative motion between the body and the fluid with the particles suspended therein to thereby cause the phosphor particles to impinge on the surface and emit light as a result of such impingement, and recording the phosphor emitted light patterns.

2. A process for obtaining information about the flow of fluid in contact with the surface of a body comprising suspending in a light-transmitting fluid, triboluminescent phosphor particles of from about 11.5 m. to about 31.0 m., causing relative motion between the body and the fluid with the particles suspended therein, to thereby cause the phosphor particles to impinge on the surface and emit light as a result of such impingement, and recording the phosphor emitted light patterns.

3. A process comprising incorporating in a light-transmitting stream, triboluminescent phosphor particles, causing the fluid stream to strike a surface to thereby cause the phosphor to emit light, and recording the phosphor-emitted light patterns.

4. A process for measuring the frictional forces arising from relative motion between a fluid and a body immersed in the fluid, comprising the steps of:

suspending triboluminescent phosphor particles in the fluid;

imparting relative motion to said body and the fluid; and recording the intensity of light emitted as a result of the particles coming into frictional contact with the body.

5. A process for measuring the frictional forces arising from the impact of a fluid stream striking a light transmitting surface, comprising:

incorporating triboluminescent particles in the fluid;

causing the fluid stream with the particles incorporated therein to strike the surface, thereby inducing light emission from the triboluminescent particles; and recording the emitted light patterns through the light transmitting surface.

References Cited in the file of this patent

UNITED STATES PATENTS

| | | |
|---|---|---|
| 2,449,880 | Cox | Sept. 21, 1948 |
| 2,640,936 | Pajes | June 2, 1953 |
| 2,841,713 | Howard | July 1, 1958 |
| 2,936,371 | White et al. | May 10, 1960 |
| 2,936,416 | Hurvitz | May 10, 1960 |
| 2,984,744 | Lynch et al. | May 16, 1961 |